Patented Apr. 20, 1937

2,077,856

UNITED STATES PATENT OFFICE 2,077,856

METHOD FOR PRODUCING STABLE ALKALI POLYSULPHIDES

Otto Röhm, Darmstadt, Germany

No Drawing. Application March 3, 1936, Serial No. 66,943. In Germany April 1, 1935

6 Claims. (Cl. 23—138)

The invention relates to stabilized alkali polysulphides and to methods of producing the same.

Alkali polysulphides are much used technically, one of the uses being for the extermination of pests. However, owing to their poor keeping qualities, the use of alkali polysulphides in either solid or dissolved form is quite limited.

It has already been proposed to stabilize alkali polysulphide solutions by adding substances thereto which are soluble therein, such, for example, as various kinds of sugars, alcohols such as glycerin, etc. Of these addition agents, as far as applicant is aware, only glycerin has attained technical significance. The other addition agents so far recommended have only a very deficient stabilizing effect.

It has been found that alkali polysulphides may be stabilized in an exceptional manner by means of thiocyanogen compounds. All soluble thiocyanogen salts are suitable except ammonium thiocyanate, which, as is well known, becomes altered by alkalies.

The polysulphides may be produced by the usual methods, e. g. by fusing sulphur with sulphides or by boiling sulphur in sulphide solutions. The thiocyanogen salt may be incorporated with the alkali polysulphide or with a solution thereof.

The alkali polysulphide may be employed as such or in combination with other materials such as soap. For example, mixtures may be made of alkali polysulphides with commercial powdered soaps, or even rosin soaps, and the stabilizing substance or thiocyanogen salts incorporated either prior to or during the preparation of such mixtures. In this way dry powders may be produced which are easy to pack, ship, and measure out for use.

The applicability of thiocyanogen salts as stabilizing agents for alkali polysulphides and their solutions could not have been deduced from the hitherto proposed stabilizing agents. The use of thiocyanogen salts, furthermore, presents the advantage that these by themselves possess germicidal properties. This renders it possible to secure a combination effect.

Example 1.—64 parts of crystalline sodium sulphide are melted in its water of crystallization and boiled with 33 parts of powdered sulphur until the latter enters into solution. 10 parts of potassium thiocyanate are then incorporated with the reaction mixture.

Example 2.—100 parts of an alkali polysulphide prepared as for Example 1, or otherwise, are mixed with 3 parts of sodium thiocyanate and the reaction mixture mixed with 500–900 parts of soap, e. g. powdered soap or rosin soap, in a kneading machine.

By using thiocyanogen salts within the meaning of the invention, it is readily possible to produce commercial dry powdered products. A very simple procedure can be used, e. g. by drying the mixture of polysulphide and potassium thiocyanate in vacuo.

Example 3.—65 parts of crystallized sodium sulphide and 8.5 parts of sodium thiocyanate are melted together and the fusion mass boiled with 26.5 parts of sulphur. Twice the quantity of soap is introduced into the finished polysulphide. Such a dry product may be dissolved in 30 to 50 times as much water and used advantageously for spraying pest infected plants.

I claim:

1. As a new composition of matter, an alkali polysulphide stabilized by admixture with an alkali metal thiocyanate.

2. As a new composition of matter, an alkali polysulphide stabilized by admixture with sodium thiocyanate.

3. As a new composition of matter, an alkali polysulphide stabilized by admixture with potassium thiocyanate.

4. A method of producing stable alkali polysulphides which comprises melting crystalline sodium sulphide in its water of crystallization and boiling the same with powdered sulphur until the latter enters solution, then incorporating potassium thiocyanate with the reaction mixture.

5. A process of stabilizing alkali polysulphides, which comprises mixing therewith sodium thiocyanate and kneading the mixture.

6. A process of producing stabilized alkali polysulphides, which comprises melting together crystallized sodium sulphide and sodium thiocyanate, and boiling the fusion mass with sulphur until a reaction takes place.

OTTO RÖHM.